Patented Jan. 3, 1950

2,493,399

UNITED STATES PATENT OFFICE 2,493,399

PROCESS FOR PREPARING IODINATED 2-AMINO-THIAZOLE

Yvonne Garreau, Paris, France, assignor to Societe Generale d'Applications Therapeutiques "Theraplix," Paris, France No Drawing. Application May 6, 1947, Serial No. 746,326. In France March 25, 1944

Section 1, Public Law 690, August 8, 1946
Patent expires March 25, 1964

2 Claims. (Cl. 260—302)

The invention has for its object to provide a process for preparing 2-amino-thiazoles in which one of the carbon atoms which are not linked to the amino group is attached to an iodine atom.

There exist two isomeric varieties of these compounds which varieties are represented by the formulae:

$$R-C=C-I \quad\quad I-C=C-R$$
$$\phantom{R-}N\phantom{==}S \quad\text{and}\quad N\phantom{==}S$$
$$\phantom{R-}\phantom{N}C\phantom{==}\phantom{S} \quad\quad \phantom{N}C$$
$$\phantom{R-N}NHR' \quad\quad\quad NHR'$$

in which R and R' represent either hydrogen, or alkyl, alkylene, aryl, carboxyl, or acidyl groups (such as acetyl), which may be identical or different.

These substances are narcotics and can be used either as general anaesthetics which may be administered by injections in aqueous solutions, in cachets or in pills, or as soporifics in drops, cachets or pills.

They may be used as starting materials for the synthesis of iodinated sulfamides. They can also be used for administering iodine.

The applicant has discovered that it is possible to prepare these substances by the action of iodine chloride (ICl) on the bases or their salts, dissolved in an acid medium where the starting material is readily soluble, such as hydrochloric or acetic acid.

The reaction takes place in accordance with the following diagram:

$$\text{(4)}R-C=C-H\text{(5)} \quad\quad R-C=C-I$$
$$\phantom{(4)R-}| \phantom{==} | \quad +\text{ICl}\longrightarrow \phantom{R-}| \phantom{==} | \quad +\text{HCl}$$
$$\text{(3)}N\phantom{=}S\text{(1)} \quad\quad\quad\quad N\phantom{=}S$$
$$\phantom{(3)N}C\text{(2)} \quad\quad\quad\quad \phantom{N}C$$
$$\phantom{(3)N}NHR' \quad\quad\quad\quad NHR'$$

Two cases may arise:

(a) There is no substitution at 4 or 5 (R represents hydrogen). In this case, iodination is effected on one or other of the two positions 4 or 5 and a complex mixture is precipitated.

(b) In the case in which the thiazole is substituted at 4 or at 5 (R represents an alkyl, aryl, carboxyl or other radical), the position 5 or 4 alone remaining available, iodination is effected on the free position.

This process enables the iodinated compounds of the acetylated derivatives (R') of the amine function of the 2-amino-thiazoles to be obtained.

These compounds can be obtained either by directly iodinating the acetylated derivatives, or on the contrary by acetylating the derivatives which have already been iodinated. In both cases, the acetylation can be effected by means of acetic anhydride or of acetyl chloride.

On the other hand, all these iodinated derivatives can form with iodine chloride (ICl) combinations of addition which are precipitated in crystalline form when an excess of iodine chloride is poured into a hydrochloride solution of the iodinated thiazole.

*Example I.*—Case in which R is the radical $CH_3$ and R' hydrogen (2-amino-4-methyl-5-iodo-thiazole).

17 gm. of 2-amino-4-methyl-thiazole hydrochloride are dissolved in 560 cc. of water, to which 84 cc. of hydrochloric acid have been added ($d=1.19$). After cooling to a temperature below 10° C., 12 gm. of iodine chloride are added. Pearly needles of 2-amino-4-methyl-5-iodo-thiazole hydrochloride quickly separate out and are drained. Yield: 15 gm. This product (melting point=160° C.) is very soluble in boiling water, boiling methyl and ethyl alcohols, insoluble in benzene, ether, acetone. From its hot aqueous solution to which ammonia has been added, the base separates out in the form of scales (melting point=114° C.).

*Example II.*—Case in which R and R' are hydrogen [2-amino-(4 or 5)-iodo-thiazole].

The technique is the same as hereinbefore, the 17 gm. of 2-amino-4-methyl-thiazole hydrochloride being replaced by an equivalent quantity of 2-amino-thiazole hydrobromide.

After concentrating, needles of 2-amino-(4 or 5) - iodo - thiazole hydrobromide (melting point=135–136°) are obtained, which are fairly soluble in cold water. From the aqueous solution to which ammonia has been added, the base precipitates out in the form of scales (melting point=112° C.).

*Example III.*—Case in which R is the carboxyl radical COOH—, R' hydrogen (2-amino-thiazole-4;5-iodo-carboxylic acid).

The technique is the same as hereinbefore, replacing the 17 gm. of 2-amino-4-methyl-thiazole hydrochloride by an equivalent quantity of 2-amino-4-thiazole-carboxylic acid.

Needles are obtained (melting point=220° C. decomposition) which are very soluble in boiling water, soluble in hot methyl and ethyl elcohols and soluble in dilute alkaline lyes.

*Example IV.*—In the case in which R is hydrogen and R' the acetyl radical CH₃—CO—(2-acetylamino-(4 or 5)-iodo-thiazole).

45 gm. of 2-acetylamino-thiazole are dissolved in 100 cc. of crystallizable acetic acid and 45 gm. of iodine chloride are added. After several hours, the 2-acetylamino-(4 or 5)-iodo-thiazole is dried.

Needles are obtained (melting point=230° C. decomposition) which are insoluble in boiling water, soluble in boiling methyl and ethyl alcohols, less soluble in the cold state, soluble in hot acetone, insoluble in ether.

*Example V.*—Case in which R is the methyl radical CH₃ and R' is the acetyl radical CH₃CO— (2-acetylamino-4-methyl-5-iodo-thiazole).

The starting material comprising 2-acetyl-amino-4-methyl-thiazole is treated according to the foregoing technique and produces needles (melting point=220° C.) which are very slightly soluble in boiling water, soluble in ethyl and methyl alcohols, insoluble in ether and benzene.

*Example VI.*—Case in which R is the carboxyl radical COOH and R' the acetyl radical CH₃CO— (2-acetylamino-thiazole - 4;5 - iodo - carboxlylic acid).

The technique of Example I applied to the 2-acetylamino-4-thiazole-carboxylic acid produces scales (melting point above 310° C.) which are insoluble in boiling water, slightly soluble in boiling methyl and ethyl alcohols, soluble in dilute acetic acid and alkalis.

As hereinbefore stated, it is possible, by means of the foregoing processes, to prepare compounds of addition with iodine chloride.

*Example VII.*—Preparation of the combination of addition of iodine chloride and 2-acetylamino-4-methyl-5-iodo-thiazole (compare with Example V).

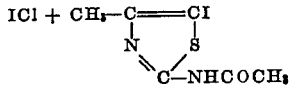

28 gm. of 2-acetyl-4-methyl-5-iodo-thiazole are dissolved in 110 cc. of tepid hydrochloric acid (d=1.19): 17 gm. of iodine chloride are added. The combination of addition is immediately precipitated in the form of yellow needles (melting point=148° C.) This product loses ICl when heated or when dissolved in a solvent other than concentrated hydrochloric acid. Yield : 38 gm.

*Example VIII.*—Preparation of the combination of addition of iodine chloride with the product of Example III (2-amino-thiazole-4;5-iodo-carboxylic acid).

By applying a similar technique to that of Example VII, yellow scales are obtained (melting point=217–218° C. decomposition), which are insoluble in water, methyl or ethyl alcohols. By prolonged heating in water, this substance loses its iodine chloride.

As hereinbefore stated, the above described novel chemical compounds form narcotics. When used as anaesthetics, they should be given in a dose of about 100 mgm. per kg. of body weight, in an aqueous solution nearly at saturation point, i. e. 2 to 5 gm. per cc. of water, or in cachets, or in pills with a usual excipient. When used as soporifics, they should be given in a dose of about 5 to 10 mgm. per kg. of body weight, in a concentrated solution or in cachets or pills.

Having now described my invention what I claim as new and desire to secure by Letters Patent is:

1. A process for preparing new iodine derivatives of 2-amino-thiazole which comprises reacting iodine chloride with a 2-amino-thiazole in the presence of an acid wherein the 2-amino-thiazole is readily soluble.

2. A process as claimed in claim 1 for preparing compounds of addition of the said iodine derivative with iodine chloride, which comprises precipitating said derivative in a hydrochloric medium with iodine chloride.

YVONNE GARREAU.

REFERENCES CITED

The following references are of record in the file of this patent:

Ochiai et al.: Berichte 72B–1939, pp. 1470–1476.
Chemical Abstracts, vol. 40, page 2445 (citing Comptes Rendus, 218, pp. 597-598).